United States Patent
Hayakawa et al.

(10) Patent No.: US 10,224,683 B2
(45) Date of Patent: Mar. 5, 2019

(54) COMPOSITE CABLE AND COMPOSITE HARNESS

(71) Applicant: Hitachi Metals, Ltd., Tokyo (JP)

(72) Inventors: Yoshikazu Hayakawa, Hitachi (JP); Tomoyuki Murayama, Hitachi (JP); Hiroyuki Ito, Kasama (JP); Naoya Toyoshima, Tokai-mura (JP); Hirotaka Eshima, Hitachi (JP); Fumihito Oka, Hitachi (JP); Takahiro Futatsumori, Mito (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 15/904,879

(22) Filed: Feb. 26, 2018

(65) Prior Publication Data

US 2018/0191114 A1 Jul. 5, 2018

Related U.S. Application Data

(63) Continuation of application No. 15/030,445, filed as application No. PCT/JP2015/076015 on Sep. 14, 2015, now Pat. No. 9,948,047.

(51) Int. Cl.
*H01R 31/00* (2006.01)
*B60T 13/74* (2006.01)
(Continued)

(52) U.S. Cl.
CPC ....... *H01R 31/005* (2013.01); *B60R 16/0215* (2013.01); *B60T 7/107* (2013.01);
(Continued)

(58) Field of Classification Search
CPC ............................ H01R 31/005; H01B 7/1855
See application file for complete search history.

(56) References Cited

U.S. PATENT DOCUMENTS 2,109,334 A * 2/1938 Heinrich ................ H01B 11/06
174/105 R
6,124,551 A 9/2000 Mattos et al.
(Continued)

FOREIGN PATENT DOCUMENTS

JP 2014135153 A 7/2014

OTHER PUBLICATIONS

Notification of transmittal of translation of the International Preliminary Report on Patentability and written opinion of the International Searching Authority in Application No. PCT/JP2015/076015 dated Mar. 29, 2018.

*Primary Examiner* — William H Mayo, III
*Assistant Examiner* — Hiram E Gonzalez
(74) *Attorney, Agent, or Firm* — Roberts Mlotkowski Safran Cole & Calderon, P.C.

(57) ABSTRACT

[Problem] Provided are a composite cable and a composite harness that allow the improvement of cable termination workability while maintaining the flex resistance.
[Solution] A composite cable 1 is provided with a pair of first electric wires 2, a twisted pair wire 4 formed by twisting a pair of second electric wires 3 having a smaller outer diameter than the first electric wires 2 and a tape member 6 spirally wound around an assembled article 5 that is formed by twisting the pair of first electric wires 2 and the twisted pair wire 4 together, wherein a twist direction of the twisted pair wire 4 is different from a twist direction of the assembled article 5, and the twist direction of the assembled article 5 is different from a winding direction of the tape member 6.

12 Claims, 3 Drawing Sheets

(51) Int. Cl.

| | | |
|---|---|---|
| *B60R 16/02* | (2006.01) | |
| *H01R 13/04* | (2006.01) | |
| *H01R 25/00* | (2006.01) | |
| *H01B 11/02* | (2006.01) | |
| *H01B 7/00* | (2006.01) | |
| *H01B 7/18* | (2006.01) | |
| *B60T 7/10* | (2006.01) | |

(52) U.S. Cl.
CPC ............ *B60T 13/74* (2013.01); *B60T 13/741* (2013.01); *H01B 7/0045* (2013.01); *H01B 7/1855* (2013.01); *H01B 11/02* (2013.01); *H01R 13/04* (2013.01); *H01R 25/003* (2013.01); *H01R 2201/26* (2013.01)

(56) References Cited

U.S. PATENT DOCUMENTS

| | | | |
|---|---|---|---|
| 6,194,663 B1 | 2/2001 | Friesen et al. | |
| 6,770,819 B2* | 8/2004 | Patel | H01B 11/005 |
| | | | 174/113 R |
| 9,349,507 B2* | 5/2016 | Vu | H01B 11/1025 |
| 9,576,700 B2* | 2/2017 | Yamamoto | B60R 16/0215 |
| 2014/0190741 A1 | 7/2014 | Hayakawa | |
| 2014/0326480 A1* | 11/2014 | Hashimoto | H01B 7/295 |
| | | | 174/113 R |

\* cited by examiner

COMPOSITE CABLE AND COMPOSITE HARNESS

TECHNICAL FIELD

The present invention relates to a composite cable and a composite harness and, in particular, to a composite cable and a composite harness which are used in a vehicle such as automobile for connection between a wheel side and a vehicle body side.

BACKGROUND ART

In recent years, electrically operated brake units are used in vehicles such as automobiles.

Electro-mechanical brakes (EMB) and electric parking brakes (EPB), etc., are known as such electrically operated brake units.

The electro-mechanical brakes, also simply called electric friction brake or electric brake, are configured such that a rotational drive force of a dedicated electric motor mounted on each wheel of a vehicle is controlled according to the operation amount (tread force or displacement amount) of a brake pedal by a driver, so that a piston driven by the electric motor presses brake pads against a disc rotor of the wheel to generate a braking force intended by the driver The electric parking brakes are configured such that a dedicated electric motor provided on each wheel of a vehicle is driven based on an operation performed on a parking brake activation switch by a driver after stopping a vehicle, so that a piston driven by the electric motor presses brake pads against a disc rotor of the wheel to generate a braking force.

Meanwhile, in recent years, sensors, e.g., ABS (Anti-Lock Brake System) sensor for detecting the speed of a wheel rotation during motion, air pressure sensor for detecting air pressure of a tire and temperature sensor, etc., are often mounted on wheels of vehicles.

Accordingly, the wheel side and the vehicle body side are connected through composite cables in which a signal line for a sensor mounted on a wheel or a signal line for controlling an electro-mechanical brake and a power line for supplying power to an electric motor of electro-mechanical brake or electric parking brake are housed in one sheath. The composite cables with connectors integrally provided at end portions are called composite harness.

PTL 1 proposes a composite cable in which a lubricant such as talc powder is interposed between plural electric wires and a sheath covering all the plural electric wires together so that friction between the electric wires and the sheath is reduced to reduce stress applied to the electric wires when being bent and flex resistance is thereby improved.

CITATION LIST

Patent Literature

[PTL 1]
JP-A-2014-135153

SUMMARY OF INVENTION

Technical Problem

The composite cable described in PTL 1, however, has a problem that the lubricant such as talc powder needs to be removed by, e.g., wiping when terminating the cable and it takes time and effort to terminate the cable.

Thus, an object of the invention is to provide a composite cable and a composite harness that allow the improvement of cable termination workability while maintaining the flex resistance.

Solution to Problem

To solve the above-mentioned problems, the invention provides a composite cable comprising: a pair of first electric wires; a twisted pair wire formed by twisting a pair of second electric wires having a smaller outer diameter than the first electric wires; and a tape member spirally wound around an assembled article that is formed by twisting the pair of first electric wires and the twisted pair wire together, wherein a twist direction of the twisted pair wire is different from a twist direction of the assembled article, and the twist direction of the assembled article is different from a winding direction of the tape member.

To solve the above-mentioned problems, the invention also provides a composite harness comprising the composite cable described above; and a connector attached to at least one of end portions of the first electric wires and of the second electric wires.

Advantageous Effects of Invention

According to the invention, a composite cable and a composite harness can be provided that allow the improvement of cable termination workability while maintaining the flex resistance.

DESCRIPTION OF EMBODIMENT

[Embodiment]

An embodiment of the invention will be described below in conjunction with the appended drawings.

(Description of the Vehicle in Which the Composite Cable is Used)

Figure 1:
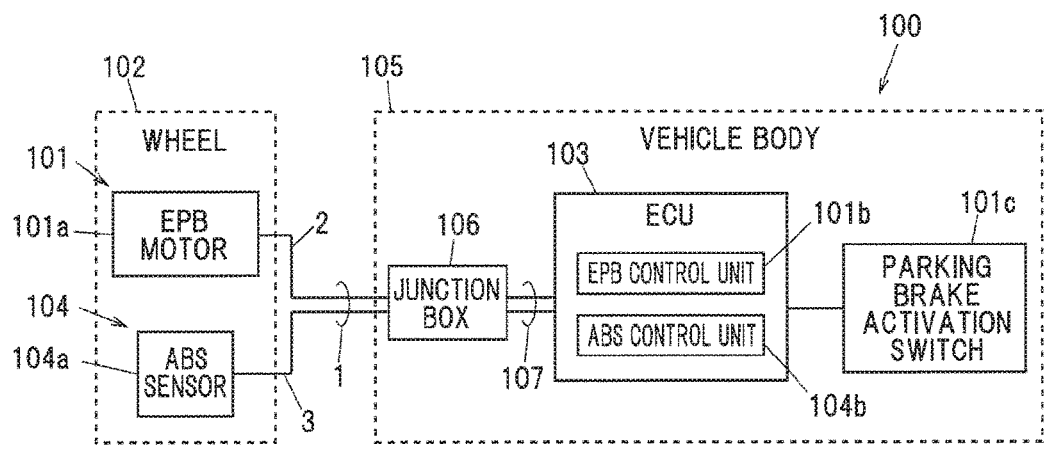
FIG. 1 is a block diagram illustrating a configuration of a vehicle in which a composite cable in an embodiment of the present embodiment is used.

FIG. 1 is a block diagram illustrating a configuration of a vehicle in which a composite cable in the present embodiment is used.

As shown in FIG. 1, a vehicle 100 is provided with an electric parking brake (hereinafter, referred to as "EPB") 101 as an electrically operated brake unit.

The EPB 101 is provided with an EPB motor 101a and an EPB control unit 101b.

The EPB motor 101a is mounted on a wheel 102 of the vehicle 100. The EPB control unit 101b is mounted on an ECU (electronic control unit) 103 of the vehicle 100. Alternatively, the control unit 101b may be mounted on a control unit other than the ECU 103, or may be mounted on a dedicated hardware unit.

The EPB motor 101a is provided with a piston to which brake pads are attached even though it is not illustrated, and it is configured such that the piston moved by rotary drive of the EPB motor 101a presses the brake pads against a disc rotor of a wheel (the wheel 102) to generate a braking force. A pair of first electric wires 2 as power lines are connected to the EPB motor 101a to supply a drive current to the EPB motor 101a.

The EPB control unit 101b is configured to output a drive current to the EPB motor 101a for a predetermined period of time (e.g., for 1 second) when a parking brake activation switch 101c is turned from an OFF state to an ON state during the stationary state of the vehicle 100 so that the brake pads are pressed against the disc rotor of the wheel 102 and a braking force to be applied to the wheel 102 is generated. The EPB control unit 101b is also configured to output a drive current to the EPB motor 101a when the parking brake activation switch 101c is turned from the ON state to the OFF state or when an accelerator pedal is depressed so that the brake pads move away from the disc rotor of the wheel and the braking force on the wheel 102 is released. In other words, it is configured such that an operating state of the EPB 101 is maintained from when the parking brake activation switch 101c is turned on to when the parking brake activation switch 101c is turned off or the accelerator pedal is depressed. The parking brake activation switch 101c may be a switch of either a lever-type or pedal-type.

An ABS device 104 is also mounted on the vehicle 100. The ABS device 104 is provided with an ABS sensor 104a and an ABS control unit 104b.

The ABS sensor 104a is mounted on the wheel 102 to detect a rotation speed of the wheel 102 during motion of the vehicle. The ABS control unit 104b is mounted on the ECU 103 to control a brake unit based on an output of the ABS sensor 104a to adjust a braking force applied to the wheel 102 so that the wheel 102 is not locked when suddenly stopped. A pair of second electric wires 3 as signal lines are connected to the ABS sensor 104a.

Figure 2A:
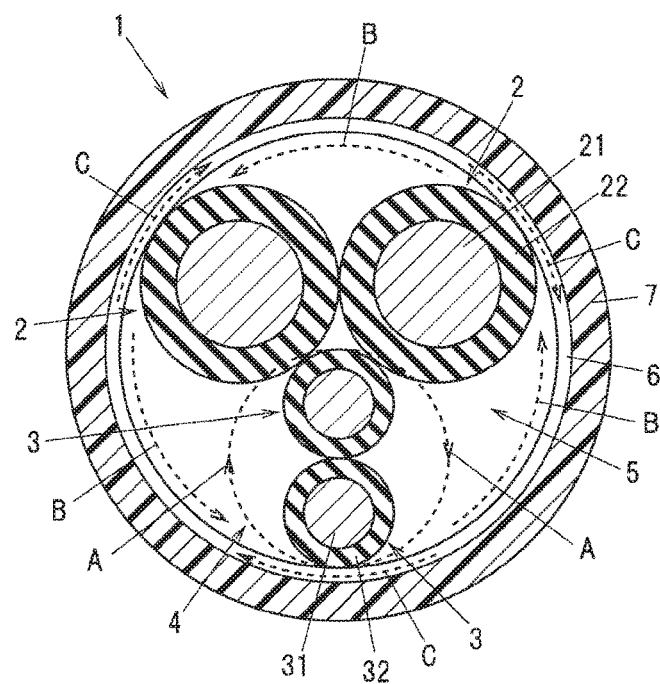
FIG. 2A is a cross sectional view showing the composite cable in the embodiment of the invention.

A composite cable 1 in the present embodiment is obtained by covering all the first electric wires 2 and the second electric wires 3 with a sheath 7 (see FIG. 2A). The composite cable 1 extending out of the wheel 102 side is connected to a wire group 107 inside a junction box 106 provided on a vehicle body 105 and is then connected to the ECU 103 and a battery (not shown) via the wire group 107.

Although only one wheel 102 is shown in FIG. 1 to simplify the drawing, the EPB motor 101a and the ABS sensor 104a may be mounted on each of the wheels 102 of the vehicle 100, or may be mounted on, e.g., only front wheels or only rear wheels of the vehicle 100.

(Description of Composite Cable 1)

Figure 2B:
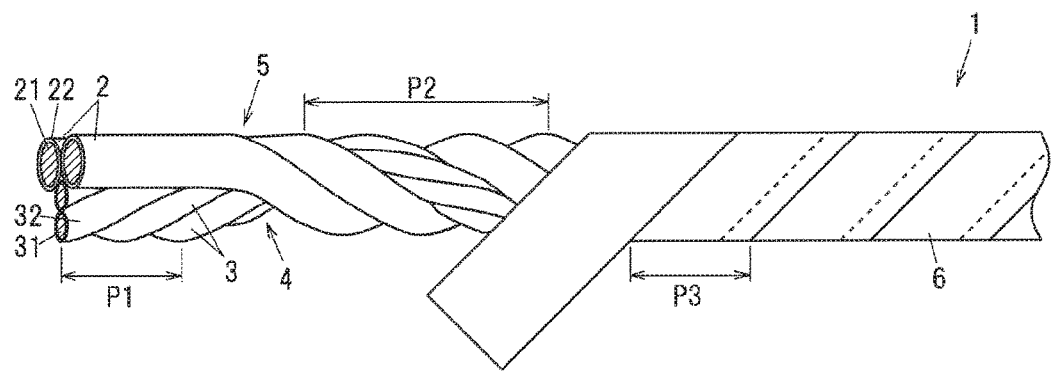
FIG. 2B is an explanatory diagram illustrating twist directions of first electric wires and second electric wires and a winding direction of a tape member in the composite cable shown in FIG. 2A.

FIG. 2A is a cross sectional view showing the composite cable 1 in the present embodiment and FIG. 2B is an explanatory diagram illustrating twist directions of first electric wires and second electric wires and a winding direction of a tape member.

As shown in FIGS. 2A and 2B, the composite cable 1 is provided with the pair of first electric wires 2, a twisted pair wire 4 formed by twisting the pair of second electric wires 3 having a smaller outer diameter than the first electric wires 2, a tape member 6 spirally wound around an assembled article 5 which is formed by twisting the pair of first electric wires 2 and the twisted pair wire 4 together, and the sheath 7 provided to cover the periphery of the tape member 6.

In the present embodiment, the first electric wire 2 is constructed using a power line for supplying a drive current to the motor 101a for the EPB 101 mounted on the wheel 102 of the vehicle 100. Meanwhile, the second electric wire 3 is constructed using a signal line for the ABS sensor 104a mounted on the wheel 102.

The first electric wire 2 is configured such that a first conductor 21 formed by twisting highly conductive strands of copper, etc., is covered with a first insulation 22 formed of an insulating resin.

Strands having a diameter of not less than 0.05 mm and not more than 0.30 mm can be used to form the first conductor 21. When using strands having a diameter of less than 0.05 mm, sufficient mechanical strength may not be obtained, causing a decrease in flex resistance. When using strands having a diameter of more than 0.30 mm, flexibility of the composite cable 1 may decrease.

The outer diameter of the first conductor 21 and the thickness of the insulation 22 of the first electric wire 2 are appropriately adjusted according to magnitude of required drive current. In the present embodiment, considering that the first electric wire 2 is a power line for supplying a drive current to the motor 101a for the EPB 101, the outer diameter of the first conductor 21 is set to not less than 1.5 mm and not more than 3.0 mm and the outer diameter of the first electric wire 2 is set to not less than 2.0 mm and not more than 4.0 mm.

The second electric wire 3 is configured such that a second conductor 31 formed by twisting highly conductive strands of copper, etc., is covered with a second insulation 32 formed of an insulating resin such as cross-linked polyethylene. Strands having a diameter of not less than 0.05 mm and not more than 0.30 mm can be used to form the second conductor 31, in the same manner as the first conductor 21.

The outer diameter of the second electric wire 3 is smaller than that of the first electric wire 2. In the present embodiment, the twisted pair wire 4 formed by twisting a pair (two) of second electric wires 3 is twisted with the pair of first electric wires 2. Therefore, from the viewpoint of making the outer diameter of the composite cable 1 close to a circular shape, it is desirable to use the second electric wire 3 which is about half the outer diameter of the first electric wire 2. In detail, it is possible to use the second electric wire 3 which has an outer diameter of not less than 1.0 mm and not more than 1.8 mm and is formed using the second conductor 31 having an outer diameter of not less than 0.4 mm and not more than 1.0 mm.

A twist pitch P1 of the twisted pair wire 4 is set by taking into account the outer diameter of the second electric wire 3 so that an unnecessary load is not applied to the second electric wires 3. The twist pitch P1 of the twisted pair wire 4 here is about 30 mm, but the twist pitch P1 of the twisted pair wire 4 is not limited thereto. The twist pitch P1 of the twisted pair wire 4 is a distance along a longitudinal direction of the twisted pair wire 4 at which a given second electric wire 3 is located at the same position in a circumferential direction of the twisted pair wire 4.

The assembled article 5 is formed by twisting the pair of first electric wires 2 and the twisted pair wire 4 together. In the present embodiment, the assembled article 5 is configured so that the pair of first electric wires 2 are in contact with each other, the pair of second electric wires 3 are in contact with each other and the pair of first electric wires 2 are further in contact with the second electric wires 3. In this configuration, the second electric wires 3 are at least partially arranged in a triangle boundary area between the pair of first electric wires 2.

Furthermore, in the present embodiment, the assembled article 5 is configured such that plural thread-like (fibrous) filler materials (not shown) extending in the longitudinal direction of the composite cable 1 are arranged between the pair of first electric wires 2/the twisted pair wire 4 and the tape member 6 and are twisted together with the first electric wires 2 and the twisted pair wire 4. Thus, the twist direction and twist pitch of the plural filler materials are the same as those of the assembled article 5. The plural filler materials are arranged to fill a gap between the pair of first electric wires 2/the twisted pair wire 4 and the tape member 6, so that a cross sectional shape after winding the tape member 6 around the assembled article 5 is closer to a circle.

Some of the plural filler materials may be arranged in a triangle boundary area between the pair of first electric wires 2 and a triangle boundary area between the pair of second electric wires 3.

As the filler material, it is possible to use a fibrous material such as polypropylene yarn, spun rayon yarn (rayon staple fiber), aramid fiber, nylon fiber or fiber plastic, a paper or a cotton yarn. In addition, the cross sectional area of the filler materials on the cross section of FIG. 2 is preferably smaller than the cross sectional area of the first electric wires 2 and the cross sectional area of the second electric wires 3.

In the EPB 101, a drive current is supplied to the motor 101*a* basically when the vehicle is stationary. On the other hand, the ABS sensor 104*a* is used when the vehicle is in motion, and the ABS sensor 104*a* is not used during when the drive current is supplied through the first electric wires 2. Therefore, in the present embodiment, a shield conductor around the twisted pair wire 4 is omitted. Omitting the shield conductor allows the composite cable 1 to have a smaller diameter than when providing the shield conductor and also reduces the number of components, thereby reducing the cost.

Although the first electric wire 2 for supplying a drive current to the EPB motor 101*a* is described here, the first electric wire 2 may be used to supply a drive current to, e.g., an electric motor of an electro-mechanical brake (hereinafter, referred as EMB) provided on the wheel 102. In this case, since electric current flows through the first electric wires 2 also during motion of the vehicle 100, it is desirable to provide a shield conductor around the twisted pair wire 4 to prevent malfunction of the ABS device 104 due to noise.

Meanwhile, although the second electric wire 3 as a signal line for the ABS sensor 104*a* is described here, the second electric wire 3 may be a signal line used for another sensor provided on the wheel 102, e.g., for a temperature sensor or an air pressure sensor for detecting air pressure of a tire, etc., or may be a damper wire used to control a damping device of the vehicle 100, or moreover, may be a signal line for controlling the EMB (a CAN cable, etc.). Even when the first electric wire 2 is used to supply a drive current to the EPB motor 101*a*, it is desirable to provide a shield conductor around the twisted pair wire 4 in case of using the second electric wires 3 during the stationary state of the vehicle 100 to prevent malfunction due to noise.

The outer diameter of the entire assembled article 5 is, e.g., about 5 mm to 9 mm. A twist pitch P2 of the assembled article 5 is set by taking into account the outer diameter of the assembled article 5 so that an unnecessary load is not applied to the first electric wires 2 and the twisted pair wire 4. The twist pitch P2 of the assembled article 5 here is about 60 mm, but the twist pitch P2 of the assembled article 5 is not limited thereto. The twist pitch P2 of the assembled article 5 is a distance along a longitudinal direction of the assembled article 5 at which a given first electric wire 2 or the twisted pair wire 4 is located at the same position in a circumferential direction of the assembled article 5.

The tape member 6 is spirally wound around the assembled article 5, and the tape member 6 is in contact with the pair of first electric wires 2 and the twisted pair wire 4. The tape member 6 is interposed between the assembled article 5 and the sheath 7 and serves to reduce friction between the assembled article 5 (the electric wires 2 and 3) and the sheath 7 when being bent. In other words, providing the tape member 6 can reduce friction between the electric wires 2, 3 and the sheath 7 without using a lubricant such as talc powder unlike the conventional technique, and thus reduces stress applied to the electric wires 2 and 3 when being bent, and it is thereby possible to improve flex resistance.

The tape member 6 is desirably slidable (desirably has a low friction coefficient) with respect to the first insulation 22 of the first electric wire 2 and the second insulation 32 of the second electric wire 3, and can be formed of, e.g., a non-woven fabric, a paper or a resin (a resin film, etc.). In more detail, a material of the tape member 6 is selected so that the friction coefficient (coefficient of static friction) between the tape member 6 and the insulations 22, 32 is lower than the friction coefficient (coefficient of static friction) between the sheath 7 and the insulations 22, 32 without the tape member 6.

It is also possible to use the tape member 6 having a laminated structure composed of not less than two layers. In this case, the tape member 6 is configured so that a surface to be in contact with the assembled article 5 is formed of any one of a non-woven fabric, a paper or a resin layer. For example, it can be configured such that the tape member 6 is formed by providing a resin layer on one side of a paper and is wound with the resin layer having a lower friction coefficient on the assembled article 5 side.

The tape member 6 is spirally wound around the assembled article 5 so as to overlap at a portion in a width direction (a direction perpendicular to the longitudinal direction and thickness direction of the tape member 6). The overlap width of the tape member 6 is, e.g., not less than ¼ and not more than ½ of the width of the tape member 6.

The width of the tape member 6 is determined so that creases are not formed on the tape member 6 when the tape member 6 is wound, and it is desirable that the width of the used tape member 6 be decreased with a decrease in the outer diameter of the entire assembled article 5. In detail, when the outer diameter of the entire assembled article 5 is 5 mm to 9 mm, the width of the tape member 6 is about 20 mm to 50 mm. A winding pitch P3 of the tape member 6, i.e., a distance along a longitudinal direction at which the tape member 6 is located at the same circumferential position (e.g., a distance between the widthwise edges), depends on the width of the tape member 6 and the overlap width (a winding angle of the tape member 6) and is up to about 40 mm in this case. The winding pitch P3 of the tape member 6 here is about 30 mm, but the winding pitch P3 of the tape member 6 is not limited thereto.

If the width of the tape member 6 is increased and the winding pitch P3 is also increased, the tape member 6 becomes close to the longitudinally wrapped state, resulting in that the composite cable 1 has less flexibility and is less likely to be bent. Therefore, the winding pitch P3 of the tape member 6 is desirably not more than 40 mm. When the width of the tape member 6 is reduced and the winding pitch P3 is also reduced, the number of turns increases and the composite cable 1 is likely to have a kink. However, in the present embodiment, a kink due to the tape member 6 is used to straighten a kink due to twisting of the assembled article 5 (the details will be described later).

The sheath 7 is provided around the tape member 6. The sheath 7 is formed of, e.g., a urethane resin. Although a shield conductor around the tape member 6 is omitted in the present embodiment since the first electric wires 2 are used to supply a drive current to the EPB motor 101a and the drive current flows through the first electric wires 2 in a relatively short time, a shield conductor may be provided between the tape member 6 and the sheath 7 or around the sheath 7 depending on the intended use, etc., of the first electric wires 2.

(Twist Directions of Twisted Pair Wire 4 and Assembled Article 5 and Winding Direction of Tape Member 6)

The composite cable 1 of the present embodiment is configured such that the twist direction of the twisted pair wire 4 is different from the twist direction of the assembled article 5, and the twist direction of the assembled article 5 is different from the winding direction of the tape member 6. In other words, in the composite cable 1, the twist direction of the twisted pair wire 4 and the winding direction of the tape member 6 are the same direction and only the twist direction of the assembled article 5 is different.

The twist direction here is a direction that the electric wires 2 and 3 rotate from the base end toward the front end when the composite cable 1 is viewed from the front end side (the left side of FIG. 2B, on the side where the tape member 6 overlaps upon itself). In this example, the twist direction of the twisted pair wire 4 is the right rotation (clockwise) and the twist direction of the assembled article 5 is the left rotation (counterclockwise). The twist direction of the twisted pair wire 4 is a direction of twisting two second electric wires 3 together, and the twist direction of the assembled article 5 is a direction of twisting the first electric wires 2 and the twisted pair wire 4 together.

Meanwhile, the winding direction of the tape member 6 is a direction that the tape member 6 rotates from the base end toward the front end when the composite cable 1 is viewed from the front end side (the left side of FIG. 2B, on the side where the tape member 6 overlaps upon itself). In this example, the winding direction of the tape member 6 is the right rotation (clockwise). The cross section as viewed from the front end side is shown in FIG. 2 in which the twist direction of the twisted pair wire 4 is indicated by a dashed arrow A, the twist direction of the assembled article 5 is indicated by a dashed arrow B and the winding direction of the tape member 6 is indicated by a dashed arrow C.

In general, when twisting electric wires together or spirally winding a tape, a kink is formed according to the twist direction or the winding direction and the entire cable curves spontaneously. In the present embodiment, the twist direction of the twisted pair wire 4 is different from the twist direction of the assembled article 5 and also the twist direction of the assembled article 5 is different from the winding direction of the tape member 6. Therefore, the kink of the twisted pair wire 4 and the kink of the assembled article 5 are in the opposite directions and thus cancel out each other, and also, the kink of the assembled article 5 and the kink caused by winding the tape member 6 are in the opposite directions and thus cancel out each other, and it is thereby possible to easily realize a straight composite cable 1 which is prevented from kinking up. As a result, it is possible to reduce variation in bending properties in the longitudinal direction of the composite cable 1.

In case that the twist direction of the twisted pair wire 4 is the same as the twist direction of the assembled article 5, the twisted pair wire 4 may be distorted in a direction of tightening the twist when twisting the assembled article 5, causing a change in the twist pitch P1 of the twisted pair wire 4. Differing the twist direction of the twisted pair wire 4 from the twist when twisting the assembled article 5 allows the assembled article 5 to be formed while maintaining the twist pitch P1 of the twisted pair wire 4.

In this regard, however, if the twist pitch P1 of the twisted pair wire 4 is large, the twist of the twisted pair wire 4 may loosen when twisting the assembled article 5. Therefore, the twist pitch P1 of the twisted pair wire 4 is desirably smaller than at least the twist pitch P2 of the assembled article 5. In other words, when the twist direction of the twisted pair wire 4 is different from the twist when twisting the assembled article 5, adjusting the twist pitch P1 of the twisted pair wire 4 to smaller than the twist pitch P2 of the assembled article 5 allows the twist of the twisted pair wire 4 to be less likely to unravel and it is thereby possible to stabilize the cross sectional shape of the assembled article 5.

In the present embodiment, since the kink caused by winding the tape member 6 is used to straighten the kink of the assembled article 5, the winding pitch P3 of the tape member 6 needs to be small enough to cause a kink. Therefore, the winding pitch P3 of the tape member 6 is desirably smaller than at least the twist pitch P2 of the assembled article 5. In the present embodiment, the twist pitch P1 of the twisted pair wire 4 is about 30 mm, the twist pitch P2 of the assembled article 5 is about 60 mm and the winding pitch P3 of the tape member 6 is about 30 mm.

Although the winding pitch P3 of the tape member 6 is the same as the twist pitch P1 of the twisted pair wire 4 in the present embodiment, the winding pitch P3 of the tape member 6 only needs to be not less than the twist pitch P1 of the twisted pair wire 4. In such a configuration, it is possible to reduce distortion of the tape member 6 at a portion in contact with the twisted pair wire 4 and it is easy to form the composite cable 1 having a circular cross sectional shape.

Likewise, since the twist direction of the assembled article 5 is different from the winding direction of the tape member 6, the twist pitch P2 of the assembled article 5 is less likely to change when winding the tape member 6 and it is thereby possible to stabilize the twist pitch P2 of the assembled article 5.

Furthermore, by differing the twist direction of the assembled article 5 from the winding direction of the tape member 6, the tape member 6 is prevented from entering a gap between the first electric wires 2 or between the first electric wire 2 and the twisted pair wire 4 and it is thereby possible to form the composite cable 1 having a cross sectional shape closer to a circle. This results in improving the outer appearance of the composite cable 1 and also allows the sheath 7 to be easily stripped and removed. Since the kink is reduced in the composite cable 1 as described above, the sheath 7 is stripped and removed more easily.

Furthermore, by differing the twist direction of the assembled article 5 from the winding direction of the tape member 6, a direction likely to cause buckling of the assembled article 5 can be different from a direction likely to cause buckling of the tape member 6. Therefore, it is possible to realize the composite cable 1 which is less likely to buckle even when, e.g., twist and bend are simultaneously applied to the composite cable 1.

(Description of Composite Harness Using the Composite Cable 1)

Figure 3:
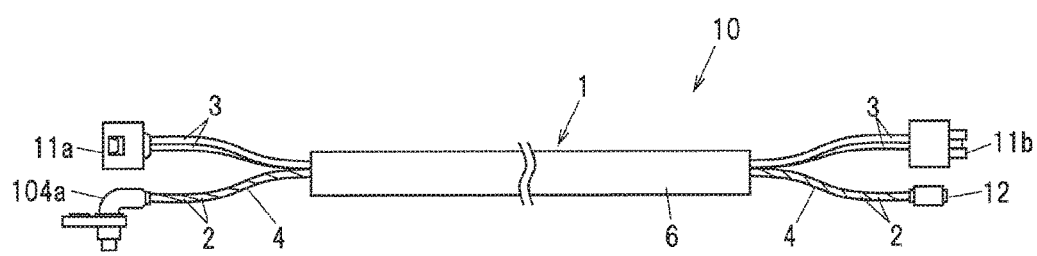
FIG. 3 is a schematic configuration diagram illustrating a composite harness in the embodiment of the invention.

FIG. 3 is a schematic configuration diagram illustrating a composite harness in the present embodiment.

As shown in FIG. 3, a composite harness 10 is composed of the composite cable 1 in the present embodiment and a connector attached to at least one of end portions of the first electric wires 2 and of the second electric wires 3.

In FIG. 3, an end portion on the wheel 102 side is shown on the left side and an end portion on the vehicle body 105 side (the junction box 106 side) is shown on the right side. In the following description, an end of the composite harness 10 on the wheel 102 side is referred to "one end" and another end on the vehicle body 105 side (the junction box 106 side) is referred to as "other end".

A wheel-side power connector 11a for connection to the EPB motor 101a is attached to one end of the pair of first electric wires 2, and a vehicle body-side power connector 11b for connection to the wire group 107 inside the junction box 106 is attached to the other end of the pair of first electric wires 2.

The ABS sensor 104a is attached to one end of the pair of second electric wires 3 (the twisted pair wire 4), and a vehicle body-side ABS connector 12 for connection to the wire group 107 inside the junction box 106 is attached to the other end of the pair of second electric wires 3 (the twisted pair wire 4).

Although the separate connectors are provided on the first electric wires 2 and the second electric wires 3 (the twisted pair wire 4) in this example, one dedicated connector may be provided so that both electric wires 2 and 3 are connected all together.

(Functions and Effects of the Embodiment)

As described above, the composite cable 1 in the present embodiment is provided with the tape member 6 spirally wound around the assembled article 5 and is configured such that the twist direction of the twisted pair wire 4 is different from the twist direction of the assembled article 5 and the twist direction of the assembled article 5 is different from the winding direction of the tape member 6.

Providing the tape member 6 can reduce friction between the electric wires 2, 3 and the sheath 7 without using a lubricant such as talc powder, and thus reduces stress applied to the electric wires 2 and 3 when being bent, and it is thereby possible to improve flex resistance. Since the tape member 6 can be easily removed when terminating the cable, it is possible to improve cable termination workability while maintaining flex resistance.

In addition, by differing the twist direction of the twisted pair wire 4 from the twist direction of the assembled article 5 and also differing the twist direction of the assembled article 5 from the winding direction of the tape member 6, the kink due to the twisting or the winding of the tape member 6 can be reduced and it is also possible to stabilize the twist pitches P1 and P2 of the twisted pair wire 4 and the assembled article 5. As a result, it is possible to reduce variation in bending properties, and also, flexibility in the longitudinal direction is stabilized and it is thereby possible to realize the composite cable 1 which is easy to route. Furthermore, since it is possible to form the composite cable 1 having a cross sectional shape closer to a circle, it is easy to strip the sheath 7.

(Summary of the Embodiments)

Technical ideas understood from the embodiment will be described below citing the reference numerals, etc., used for the embodiment. However, each reference numeral, etc., described below is not intended to limit the constituent elements in the claims to the members, etc., specifically described in the embodiment.

[1] A composite cable (1), comprising: a pair of first electric wires (2); a twisted pair wire (4) formed by twisting a pair of second electric wires (3) having a smaller outer diameter than the first electric wires (2); and a tape member (6) spirally wound around an assembled article (5) that is formed by twisting the pair of first electric wires (2) and the twisted pair wire (4) together, wherein a twist direction of the twisted pair wire (4) is different from a twist direction of the assembled article (5), and the twist direction of the assembled article (5) is different from a winding direction of the tape member (6).

[2] The composite cable (1) defined by [1], wherein a twist pitch of the twisted pair wire (4) is smaller than a twist pitch of the assembled article (5), and a winding pitch of the tape member (6) is smaller than the twist pitch of the assembled article (5) and is not less than the twist pitch of the twisted pair wire (4).

[3] The composite cable (1) defined by [1] or [2], wherein the tape member (6) is configured such that a surface thereof in contact with the assembled article (5) comprises a non-woven fabric, a paper or a resin layer.

[4] The composite cable (1) defined by any one of [1] to [3], wherein the first electric wire (2) comprises a power line for supplying a drive current to a motor (101a) for an electric parking brake (101) mounted on a wheel (102) of a vehicle (100).

[5] The composite cable (1) defined by any one of [1] to [4], wherein the second electric wire (3) comprises a signal line for a sensor mounted on a wheel (102) of a vehicle (100).

[6] The composite cable (1) defined by any one of [1] to [5], wherein the assembled article (5) comprises a plurality of thread-like filler materials arranged between the pair of first electric wires (2)/the twisted pair wire (4) and the tape member (6), the plurality of filler materials are twisted together with the pair of first electric wires (2) and the twisted pair wire (4), and a twist direction of the plurality of filler materials is the same as the twist direction of the assembled article (5) and is different from the winding direction of the tape member (6).

[7] A composite harness (10), comprising: the composite cable (1) defined by any one of [1] to [6]; and a connector attached to at least one of end portions of the first electric wires (2) and of the second electric wires (3).

Although the embodiment of the invention has been described, the invention according to claims is not to be limited to the embodiment described above. Further, please note that all combinations of the features described in the embodiment are not necessary to solve the problem of the invention.

The invention can be appropriately modified and implemented without departing from the gist thereof.

REFERENCE SIGNS LIST

1: COMPOSITE CABLE
2: FIRST ELECTRIC WIRE
3: SECOND ELECTRIC WIRE
4: TWISTED PAIR WIRE
5: ASSEMBLED ARTICLE
6: TAPE MEMBER
7: SHEATH

What is claimed is:
1. A composite cable, comprising:
a pair of first electric wires;

a twisted pair wire formed by twisting a pair of second electric wires having a smaller outer diameter than the first electric wires; and a tape member spirally wound around and contacting an assembled article that is formed by twisting the pair of first electric wires and the twisted pair wire together, and a sheath provided to cover a periphery of the tape member, wherein a twist direction of the twisted pair wire is different from a twist direction of the assembled article, and the twist direction of the assembled article is different from a winding direction of the tape member, and wherein a twist pitch of the twisted pair wire is smaller than a twist pitch of the assembled article in the sheath.

2. The composite cable according to claim 1, wherein the pair of first electric wires are in contact with each other, the pair of second electric wires are in contact with each other, and the second electric wires are at least partially arranged in a triangle boundary area between the pair of first electric wires.

3. The composite cable according to claim 2, wherein the second electric wires are in contact with the pair of first electric wires in the triangle boundary area between the pair of first electric wires.

4. The composite cable according to claim 1, wherein an outer diameter of the assembled article is 5 mm to 9 mm, a width of the tape member is 20 mm to 50 mm, and the tape member is spirally wound around the assembled article such that an overlap width of the tape member is not less than ¼ and not more than ½ of a width of the tape member.

5. The composite cable according to claim 1, wherein the tape member is configured such that a surface thereof in contact with the assembled article comprises a non-woven fabric, a paper or a resin layer.

6. The composite cable according to claim 1, wherein the first electric wire comprises a power line for supplying a drive current to a motor for an electric parking brake mounted on a wheel of a vehicle.

7. The composite cable according to claim 1, wherein the second electric wire comprises a signal line for a sensor mounted on a wheel of a vehicle.

8. The composite cable according to claim 1, wherein
the assembled article comprises a plurality of thread-like filler materials arranged between the pair of first electric wires, the twisted pair wire and the tape member,
the plurality of filler materials are twisted together with the pair of first electric wires and the twisted pair wire, and
a twist direction of the plurality of filler materials is the same as the twist direction of the assembled article and is different from the winding direction of the tape member.

9. The composite cable according to claim 1, wherein a shield conductor is provided around the twisted pair wire.

10. The composite cable according to claim 1,
wherein the first electric wire is configured such that a first conductor is covered with a first insulation,
wherein the second electric wire is configured such that a second conductor is covered with a second insulation,
wherein a friction coefficient between the tape member and the first insulation and a friction coefficient between the tape member and the second insulation are lower than a friction coefficient between the sheath and the first insulation and a friction coefficient between the sheath and the second insulation.

11. A composite harness, comprising:
the composite cable according to claim 1; and
a connector attached to at least one of end portions of the first electric wires and of the second electric wires.

12. The composite cable according to claim 1, wherein a winding pitch of the tape member is smaller than the twist pitch of the assembled article and the winding pitch of the tape member is not less than the twist pitch of the twisted pair wire.

* * * * *